(12) United States Patent
Adams et al.

(10) Patent No.: US 11,548,567 B2
(45) Date of Patent: Jan. 10, 2023

(54) REINFORCED TRAILER CHASSIS AND FLOOR

(71) Applicant: Fontaine Commercial Trailer, Inc., Haleyville, AL (US)

(72) Inventors: James Adams, Jasper, AL (US); Connor Alexander Bashinski, Birmingham, AL (US); Neil Robertson, Lawrenceville, GA (US)

(73) Assignee: Fontaine Commercial Trailer, Inc., Haleyville, AL (US)

( * ) Notice: Subject to any disclaimer, the term of this patent is extended or adjusted under 35 U.S.C. 154(b) by 0 days.

(21) Appl. No.: 17/088,747

(22) Filed: Nov. 4, 2020

(65) Prior Publication Data

US 2021/0129918 A1 May 6, 2021

Related U.S. Application Data

(60) Provisional application No. 62/930,247, filed on Nov. 4, 2019.

(51) Int. Cl.
  *B62D 25/20* (2006.01)
  *B62D 21/20* (2006.01)
  *B62D 33/02* (2006.01)
  *B62D 27/02* (2006.01)

(52) U.S. Cl.
  CPC ......... *B62D 25/2054* (2013.01); *B62D 21/20* (2013.01); *B62D 25/2036* (2013.01); *B62D 27/02* (2013.01); *B62D 33/02* (2013.01)

(58) Field of Classification Search
  CPC .... B62D 25/2054; B62D 21/20; B62D 33/02; B62D 27/02; B62D 27/023
  USPC .............................. 296/184.1, 193.07, 24.35
  See application file for complete search history.

(56) References Cited

U.S. PATENT DOCUMENTS

| 4,817,537 | A | * | 4/1989 | Cripe | B61D 3/12 |
| | | | | | 105/418 |
| 5,210,921 | A | * | 5/1993 | Booher | B62D 21/20 |
| | | | | | 29/401.1 |
| 9,676,549 | B2 | * | 6/2017 | Adams | B65D 88/744 |
| 2003/0005852 | A1 | * | 1/2003 | Okamura | B23K 33/00 |
| | | | | | 105/396 |

FOREIGN PATENT DOCUMENTS

| WO | WO-2011111510 A1 | * | 9/2011 | ......... B62D 25/2054 |
| WO | WO-2013131070 A2 | * | 9/2013 | ............. B62D 33/02 |

* cited by examiner

*Primary Examiner* — Dennis H Pedder
(74) *Attorney, Agent, or Firm* — Levenfeld Pearlstein, LLC

(57) ABSTRACT

A floor assembly for a trailer includes a pair of longitudinally extending main beams, each having a first height dimension along a first longitudinal portion of the main beam and a second height dimension along a second portion of the main beam. The first height dimension being greater than the second height dimension. Cross members extend in a transverse direction between and connect the main beams. A plurality of floor members extend transversely between the main beams. The floor members including at least some reinforced floor members. The reinforced floor members have upper and lower walls and opposing side walls that define a rectangular cross-section and include a series of truss walls extending angularly between the upper and lower walls. The reinforced floor members are positioned on the upper surfaces of the main beams at least in part at the second height dimension.

8 Claims, 1 Drawing Sheet

REINFORCED TRAILER CHASSIS AND FLOOR

CROSS-REFERENCE TO RELATED APPLICATION DATA

This application claims the benefit of and priority to Provisional U.S. Patent Application Ser. No. 62/930,247, filed Nov. 4, 2019, titled Reinforced Trailer Chassis and Floor, the disclosure of which is incorporated herein in its entirety.

BACKGROUND

The present disclosure relates generally to a trailer chassis and floor.

Trailers can be required to transport extremely heavy loads under a wide variety of conditions. As the weight of loads increases so too do the requirements on trailers needed to support the loads. Increased load requirements often results in strengthened trailer structures, which result in increased mass, that is, increased weight and size.

Some known trailer floor assemblies include one or more main beams that extend longitudinally along the length of the trailer. Cross member are positioned at various locations that extend between and connect the main beams to one another. The main beams can be, for example, I-beams, W-beams or other appropriate structural members. The cross members can be, for example I-beams that extend between the main beams to the webs of the main beams. The cross members may have notches cut out at certain locations to fit within the main beam web, between the main beam flanges.

Trailer floors are formed from a wide variety of materials, including wood planks, metal structural members and the like.

To increase the trailer's load capacity, the sizes of the structural members, for example, the main beams, cross member and floor members are increased. However, increases in weight and size of these members must be balanced against stricter requirements for emissions and increased vehicle fuel efficiency. As such, although load capacities are increased with larger and heavier trailers, these larger and heavier trailers may not meet the requirements for emissions and fuel efficiency.

Accordingly, there is a need for a trailer and chassis floor that is reinforced. Desirably, such a trailer chassis and floor are reinforced, providing increased load capacity with less mass (size and/or weight) than known trailer chassis.

SUMMARY

A floor assembly includes a pair of main beams extending in a longitudinal direction. Each main beam has a first height dimension along a first longitudinal portion of the main beam and a second height dimension along a second portion of the main beam. The first height dimension is greater than the second height dimension. Each main beam has an upper surface.

A plurality of cross members extend in a transverse direction between and connecting the main beams. The cross members are disposed below the main beams' upper surfaces.

A plurality of floor members extend in a transverse direction between the main beams and across the upper surfaces of the beams. The floor members are disposed on the main beams' upper surfaces. At least some of the floor members are extruded reinforced floor members.

The reinforced floor members have opposing upper and lower walls and opposing side walls the define a rectangular cross-section. The reinforced floor members include a series of truss walls extending angularly between an inner surface of the upper wall and an inner surface of the lower wall.

The reinforced floor members are positioned on the main beams at least at in part at the second height dimension. An embodiment of the floor assembly includes a plurality of reinforced members.

In an embodiment, the truss walls extend between the upper and lower walls at an angle of about 60 degrees relative to the upper and lower walls. In an embodiment, the reinforced floor members include six truss walls. The outer truss walls intersect a corner of the side walls and one of the upper and lower walls.

In an embodiment, the beams include a transition between the first and second heights. The reinforced floor members are disposed between the main beams at at least a portion of the transition. In an embodiment, others of the floor members are not reinforced.

The floor members are joined to adjacent floor members. In an embodiment, the floor members are welded to adjacent floor members. The floor members can be stir welded to adjacent floor members.

These and other features and advantages of the present disclosure will be apparent from the following drawings and detailed description, in conjunction with the appended claims.

DETAILED DESCRIPTION

Figure 1:
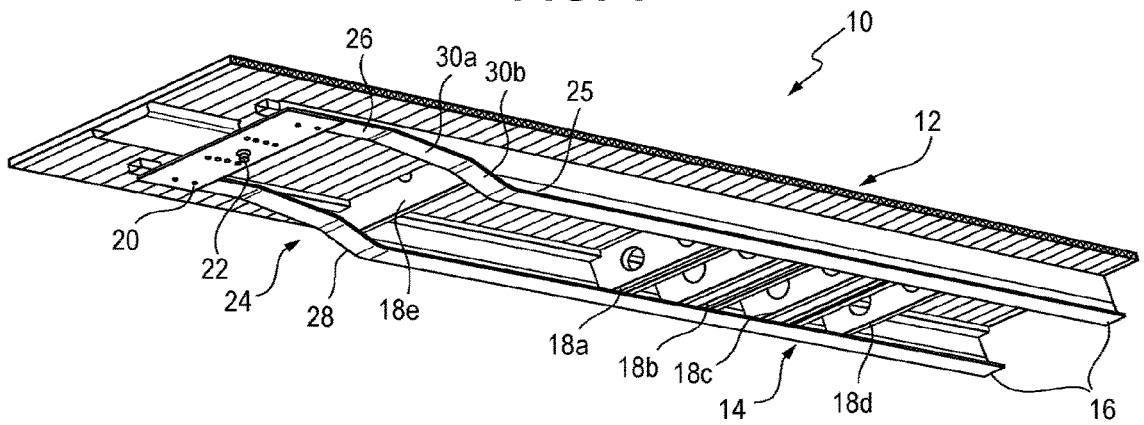
FIG. 1 is a bottom perspective view of an embodiment of a reinforced trailer floor and chassis according to the present disclosure.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

FIG. 1 illustrates one example of a floor assembly 10 for a trailer. The floor assembly 10 includes, generally, a floor 12 and a chassis 14. The chassis 14 includes main beams 16 and cross members 18. The illustrated trailer includes a pair of main beams 16 that extend longitudinally along the trailer and cross members 18 (five shown) that extend between and connect the main beams 16. A kingpin plate 20 and kingpin 22 for mounting the trailer to, for example, a tractor fifth wheel, are also shown.

Figure 2:
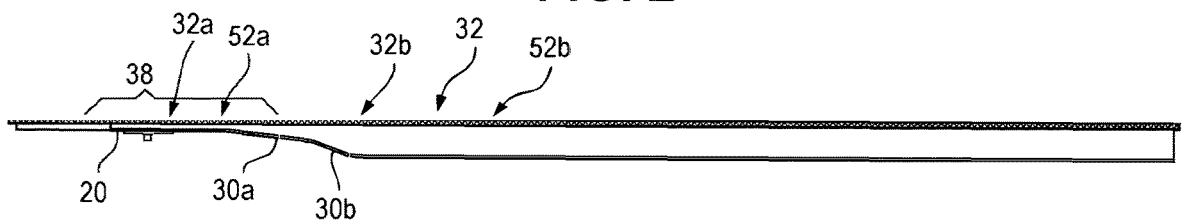
FIG. 2 is a side view of the trailer floor and chassis of FIG. 1.

As seen in FIGS. 1 and 2, the main beams 16 neck down, as indicated generally at 24 (reduced web height), toward the front of the trailer. In the illustrated trailer, four of the cross members 18a-d are present at the larger web height, as indicated at 25, and a fifth cross member 18e having a reduced or no web height is present at a transition region 28 between the larger web height 25 and the fully necked down region 26. The transition region 28 can include more than one angled regions, such as the two angled regions 30a,b best seen in FIG. 2. The kingpin plate 20 is positioned across the main beams 16 at an end of the necked down region 26.

The trailer floor 12 is formed from a plurality of floor members 32 that extend transversely across the tops 34 of the main beams 16. In an embodiment, the floor 12 is formed from a plurality of extruded aluminum tubular members. Known floor members are formed from extruded rectangular tubes or extruded U-shaped members, such as those illustrated in Adams, U.S. Pat. No. 10,059,512, which patent is commonly assigned with the present application, the disclosure of which is incorporated herein by reference in its entirety. The tubes can be joined to one another to form a rigid floor or floor panel 12. One method to join the floor member 32 members to one another is by welding, for example, by friction stir welding at locations indicated generally at 36.

Those skilled in the art will recognize friction stir welding as a technique in which a rotating cylindrical tool with a profiled probe having a pin and a shoulder is fed into a joint, such as a butt joint between two clamped workpieces, until the shoulder, which has a larger diameter than the pin, touches the surface of the workpieces. The tool shoulder rides on the top of the work surface, and is moved forward along the joint. Frictional heat is generated between the tool and the workpieces. The stirred materials of the workpieces to be joined soften without melting. As the tool is moved forward, the probe forces plasticized material from the leading face to the rear, where the high clamping forces forge consolidation of the weld.

Figure 3:
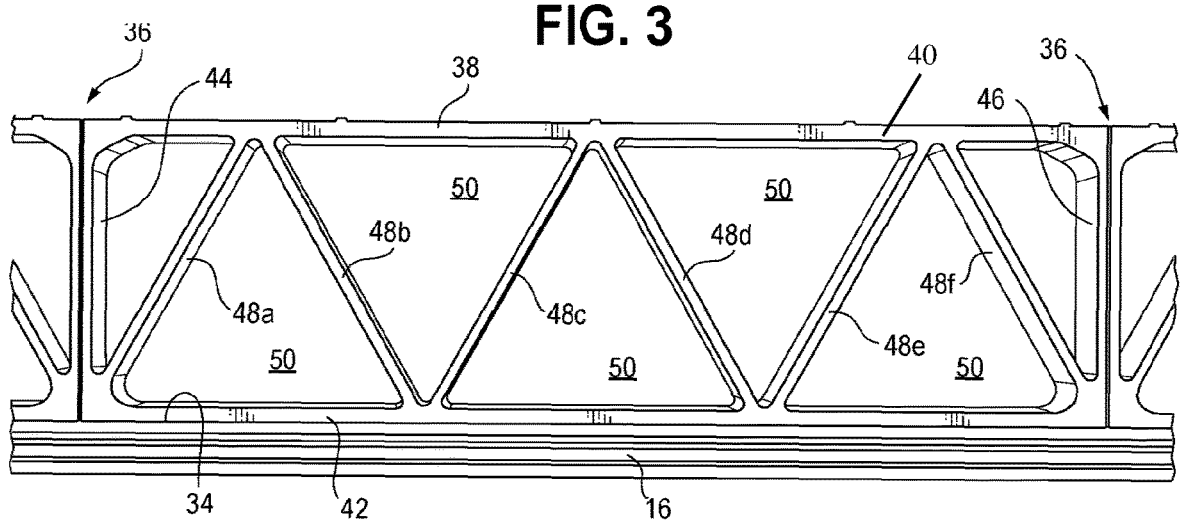
FIG. 3 is side view of a portion of the reinforced floor section and chassis.

In order to permit the use of the necked down 26 main beams 16 and retain the load bearing capacity of the trailer, the floor 12 of the trailer includes reinforced floor members 32a, such as reinforced light-weight extruded members, such as light-weight extruded aluminum members. Some or all of the floor members 32 can be reinforced floor members 32a, such as the plurality of reinforced flood members 32a indicated at 38. One example of a reinforced extruded floor member 32a is illustrated in FIG. 3. The extruded floor member 32a includes upper 40 and lower 42 opposing walls and a pair of opposing side walls 44, 46. A series of truss walls 48a-f extend between the upper and lower opposing walls 40, 42. In an embodiment, the truss walls 48a-f define trusses 50 by the walls 48a-f extending at an angle of about 60 degrees to the upper and lower walls 40, 42. In an embodiment the reinforced floor members 32a include six truss walls 48a-f that define five trusses 50. The end truss walls 48a and 48f intersect the lower wall 42 and its adjacent side walls 44, 46. The overall exterior profile of the member 32a is as a rectangular tubular member. The other, non-reinforced members 32b have a similar rectangular tubular profile, but may not include truss walls.

In that the reinforced floor members 32a are extruded, the upper and lower walls 40, 42, the side walls 44, 46 and the truss walls 48a-f are formed as a unitary member. That is, they are all formed as a unitary structural element in a single extrusion. And, as noted above, the members 32a are joined to adjacent members in a high strength joint by, for example, stir welding.

In an embodiment the reinforced floor members 32a are positioned on and extend between the main beams 16 at a location that about corresponds to the main beams necked down region 24. It will of course be appreciated that the reinforced members 32a can be at any location, including along the entirety of the length of the main beams 16 or at any other desired location or locations.

As noted above, the other, non-reinforced floor members 32b, can be of a conventional design. For example, the non-reinforced floor members 32b can be formed from structural tubular members, inverted (upside-down) square U-shaped members and the like that may or may not include any number of reinforcing truss walls. In an embodiment, the upper surfaces 52, 54 of the reinforced floor members 32a and the non-reinforced floor member 32b are flush so as to provide a flat, flush floor 12.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, forward and the like are for explanatory purposes only and are not intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A floor assembly for a trailer, comprising:
   a pair of main beams extending in a longitudinal direction, each main beam having a single first height dimension along a first longitudinal portion of the main beam and a single second height dimension along a second portion of the main beam, the first height dimension being greater than the second height dimension, each main beam having an upper surface;
   one transition between the main beam first height dimension and the main beam second height dimension, wherein the transition is a two angled step transition, wherein
   a first step of the two angled step transition is at a first angle between the main beam first height and the first step, and wherein a second step of the two angled step transition is at a second angle between first step and the second step, the first and second angles being different from one another;
   a plurality of cross members extending in a transverse direction between and connecting the main beams, the cross members disposed below the main beams' upper surfaces; and
   a plurality of floor members extending in a transverse direction between the main beams and across the upper surfaces thereof, the plurality of floor members including at least some extruded reinforced floor members, the reinforced floor members having opposing upper and lower walls and opposing side walls defining a rectangular cross-section and including a series of truss walls extending angularly between an inner surface of the upper wall and an inner surface of the lower wall, the plurality of floor members including the reinforced floor members being joined to adjacent floor members,
   wherein the reinforced floor members are positioned on the main beams at least at in part at the second height dimension, and
   wherein the reinforced floor members are disposed between the main beams at at least a portion of the two angled step transition.

2. The floor assembly of claim 1, including a plurality of reinforced members.

3. The floor assembly of claim 1 wherein the truss walls extend between the upper and lower walls first at an angle of about 60 degrees relative to the upper and lower walls.

4. The floor assembly of claim 3 including six truss walls.

5. The floor assembly of claim 4 wherein outer truss walls intersect a corner of the side walls and one of the upper and lower walls.

6. The floor assembly of claim 1, wherein others of the floor members are not reinforced.

7. The floor assembly of claim 1, wherein the floor members are welded to adjacent floor members.

8. The floor assembly of claim 7, wherein the floor members are stir welded to adjacent floor members.

\* \* \* \* \*